United States Patent
Lee et al.

(10) Patent No.: US 12,134,981 B2
(45) Date of Patent: Nov. 5, 2024

(54) COMBINED POWER GENERATION SYSTEM AND DRIVING METHOD THEREOF

(71) Applicant: DOOSAN ENERBILITY CO., LTD., Changwon-si (KR)

(72) Inventors: Kang Min Lee, Seoul (KR); Byoung Youn Kim, Yongin (KR); In Chul Shin, Yongin (KR); Eun Seong Cho, Busan (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/048,846

(22) Filed: Oct. 23, 2022

(65) Prior Publication Data

US 2023/0258128 A1    Aug. 17, 2023

(30) Foreign Application Priority Data

Feb. 14, 2022   (KR) .......................... 10-2022-0018815

(51) Int. Cl.
*F02C 6/18* (2006.01)
*H02K 7/18* (2006.01)

(52) U.S. Cl.
CPC ............. *F02C 6/18* (2013.01); *H02K 7/1823* (2013.01); *F05D 2220/72* (2013.01)

(58) Field of Classification Search
CPC ............... F02C 6/18; F02C 3/30; F01K 23/10
See application file for complete search history.

(56) References Cited

U.S. PATENT DOCUMENTS

| 5,428,953 A * | 7/1995 | Siga ........................ C22C 38/46 |
|  |  | 60/39.182 |
| 11,702,988 B2 * | 7/2023 | Araki ........................ C01B 3/04 |
|  |  | 60/780 |

(Continued)

FOREIGN PATENT DOCUMENTS

| DE | 11 2020 001242 T5 | 12/2021 |
| DE | 11 2020 001250 T5 | 12/2021 |

(Continued)

OTHER PUBLICATIONS

EP EESR, dated Jul. 17, 2023.

(Continued)

*Primary Examiner* — Thuyhang N Nguyen
(74) *Attorney, Agent, or Firm* — Harvest IP Law, LLP

(57) ABSTRACT

A combined power generation system includes a gas turbine, a heat recovery steam generator (HRSG) generating steam using combustion gas from the gas turbine, a vaporizer vaporizing liquefied ammonia, an ammonia decomposer section decomposing ammonia with the combustion gas, a first exhaust gas line through which exhaust gas from the gas turbine is transferred to the HRSG, a steam turbine generating a rotational force with the steam from the HRSG, a decomposed gas supply line through which decomposed gases generated in the ammonia decomposer section are supplied to a combustor, and a cold heat transfer line absorbing cold heat of the liquefied ammonia and supply the cold heat to the condenser section, and a condenser section condensing the steam from the steam turbine.

20 Claims, 5 Drawing Sheets

(56) References Cited

U.S. PATENT DOCUMENTS

| | | | |
|---|---|---|---|
| 11,724,245 B2* | 8/2023 | Jo | B01J 37/08 422/201 |
| 2007/0095046 A1* | 5/2007 | Wallace | B01J 4/001 60/39.12 |
| 2018/0045080 A1* | 2/2018 | Uechi | F02C 7/143 |
| 2020/0032676 A1* | 1/2020 | Nose | F23R 3/36 |
| 2021/0332759 A1 | 10/2021 | Smith | |
| 2023/0407784 A1* | 12/2023 | Takeishi | F02C 7/236 |

FOREIGN PATENT DOCUMENTS

| | | | |
|---|---|---|---|
| EP | 3517757 A1 | 7/2019 | |
| JP | 55-12201 A | 1/1980 | |
| JP | 03-3902 A | 1/1991 | |
| JP | 4859929 B2 | 1/2012 | |
| JP | 2017180266 A | 10/2017 | |
| JP | 2018076794 A | 5/2018 | |
| JP | 2018-095512 A | 6/2018 | |
| JP | 2018096616 A | 6/2018 | |
| JP | 2020147481 A | 9/2020 | |
| JP | 2020148183 A | 9/2020 | |
| JP | 2021185313 A | 12/2021 | |
| KR | 1020180084051 A | 7/2018 | |
| KR | 10-2021-0096274 A | 8/2021 | |
| KR | 10 2021 0121192 A | 10/2021 | |
| KR | 10-2583688 B1 | 9/2023 | |
| WO | 2017084876 A1 | 5/2017 | |
| WO | 2020189566 A1 | 9/2020 | |

OTHER PUBLICATIONS

KR Office Action dated Apr. 26, 2023.
JP OA, dated Dec. 12, 2023.
KR NOA, dated Aug. 1, 2024.

* cited by examiner

COMBINED POWER GENERATION SYSTEM AND DRIVING METHOD THEREOF

CROSS REFERENCE TO RELATED APPLICATION

The present application claims priority to Korean Patent Application No. 10-2022-0018815, filed on Feb. 14, 2022, the entire contents of which are incorporated herein for all purposes by this reference.

BACKGROUND OF THE INVENTION

1. Field of the Invention

The present disclosure relates to a combined power generation system and a driving method thereof. More particularly, the present disclosure relates to a combined power generation system having an ammonia decomposer, and a driving method thereof.

2. Description of the Background Art

A combined power generation system is a power generation system that combines a gas turbine and a steam turbine with high efficiency to guide high-temperature exhaust gas from the gas turbine to a heat recovery steam generator (HRSG) and generate steam using thermal energy retained in the exhaust gas. This steam enables power generation by the steam turbine and the power generated by the steam turbine can be combined with the power generated by the gas turbine to improve thermal efficiency. The combined power is closer to or equivalent to the thermal energy retained in the exhaust gas when compared to independent power production by the gas turbine.

A gas turbine is a power engine that mixes compressed air compressed in a compressor and fuel, burns an air-fuel mixture, and rotates a turbine with high-temperature combustion gas. Gas turbines are used to drive generators, aircrafts, ships, trains, and the like.

Recently, a gas turbine using hydrogen or ammonia as a fuel has been developed. A combined power generation system using ammonia as a fuel includes a pressure pump that boosts the pressure of liquid ammonia in an ammonia tank, and an ammonia decomposer that decomposes the liquid ammonia pressurized by the pressure pump into hydrogen gas and nitrogen gas, wherein the pressure of liquid ammonia in the ammonia tank is boosted to a pressure required by the ammonia decomposer. The ammonia decomposer heat-exchanges the liquid ammonia pressurized by the pressure pump with exhaust gas from a gas turbine so as to heat and decompose the liquid ammonia into hydrogen gas and nitrogen gas. Since the ammonia decomposition process is an endothermic reaction, the ammonia decomposer has a burner to decompose ammonia. The burner combusts fuel to generate heat, so there is a problem in that carbon dioxide and pollutants are generated during the combustion process of the fuel by the burner of the ammonia decomposer.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and one of objectives of the present disclosure is to provide a combined power generation system capable of reducing carbon dioxide and improving thermal efficiency, and a driving method thereof.

In an aspect of the present disclosure, there is provided a combined power generation system including: a gas turbine combusting a fuel in a combustor to generate rotational force and discharging exhaust gas; a vaporizer vaporizing liquefied ammonia and supplying vaporized ammonia; and ammonia decomposer section decomposing the vaporized ammonia supplied from the vaporizer using the exhaust gas discharged from the gas turbine and generating decomposed gases; a heat recovery steam generator (HRSG) generating steam using the exhaust gas discharged from the gas turbine; a first exhaust gas line through which the exhaust gas discharged from the gas turbine is transferred to the HRSG; a steam turbine generating a rotational force with the steam transferred from the HRSG; a decomposed gas supply line through which the decomposed gases generated in the ammonia decomposer section are supplied to the combustor; and a cold heat transfer line transferring a refrigerant that absorbed cold heat generated during vaporization of the liquefied ammonia in the vaporizer and supplying the cold heat to the condenser section, and a condenser section, connected to the cold heat transfer line, condensing the steam discharged from the steam turbine using the cold heat supplied from the cold heat transfer line and discharging condensed water.

The combined power generation system may further include a second exhaust gas line through which the exhaust gas discharged from the gas turbine is supplied to the ammonia decomposer section.

The condenser section may include a condenser condensing the steam discharged from the steam turbine, a coolant supply line supplying a coolant to the condenser, and a coolant heat exchanger connected to the coolant supply line.

The cold heat transfer line may be connected to the coolant heat exchanger.

The combined power generation system may further include an absorption tower receiving the decomposed gases generated in the ammonia decomposer section and separating residual ammonia contained in the decomposed gases, and an absorption line connecting the ammonia decomposer section and the absorption tower.

A decomposed gas heat exchanger may be installed in the decomposed gas supply line for exchanging heat between the decomposed gases supplied to the absorption tower and the decomposed gases discharged from the absorption tower.

An auxiliary heat exchanger may be installed in the absorption line for exchanging heat between the condensed water and the decomposed gases discharged from the ammonia decomposer section to cool the decomposed gases and vaporize the condensed water.

A gas-gas heat exchanger may be installed in the absorption line for exchanging heat between the decomposed gases discharged from the ammonia decomposer section and the vaporized ammonia discharged from the vaporizer.

The combined power generation system may further include an ammonia supply line through which the liquefied ammonia is supplied to the vaporizer; a regeneration tower separating the residual ammonia from an absorption liquid in which the residual ammonia and water are mixed in the absorption tower, and an ammonia regeneration line connecting the regeneration tower and the ammonia supply line.

An ammonia compressor may be installed in the ammonia regeneration line for compressing the residual ammonia separated in the regeneration tower.

A refinement line may be installed in the absorption tower for circulating the decomposed gases from which ammonia is separated in the absorption tower, and a hydrogen refiner may be installed in the refinement line for separating hydrogen from the decomposed gases.

The combined power generation system may further include a condensate heater heating the condensed water condensed in the condenser section through heat exchange with ammonia decomposer exhaust gas discharged from the ammonia decomposer section.

The ammonia decomposer section may further include an auxiliary burner forming a flame, wherein the auxiliary burner is connected to the decomposed gas supply line to combust the decomposition gases supplied from the decomposed gas supply line, and the combined power generation system may further include an air preheater heating air supplied to the auxiliary burner, using the ammonia decomposer exhaust gas discharged from the ammonia decomposer section.

In another aspect of the present disclosure, there is provided a method of driving a combined power generation system, the method including: an exhaust gas supply step of supplying an exhaust gas generated by combustion of fuel in a combustor of a gas turbine to a heat recovery steam generator (HRSG) and an ammonia decomposer section; a vaporization step of vaporizing liquefied ammonia and generating cold heat during the vaporization of the liquefied ammonia and condensing steam to condensed water; a decomposition step of decomposing the vaporized ammonia into decomposed gases using heat of the exhaust gas and heat generated from an auxiliary burner; a steam generation step of heating the condensed water using the exhaust gas and supplying the same to a steam turbine; and a combustion and power generation step of combusting the decomposed gases in the combustor, rotating a main turbine with the generated exhaust gas, and supplying the steam to the steam turbine.

In the vaporization step, the cold heat generated in the vaporizer may be transferred to a coolant heat exchanger through a cold heat transfer line.

The decomposed gas supply step may include an ammonia absorption step of supplying the decomposed gas generated in the ammonia decomposer section to an absorption tower to separate residual ammonia contained in the decomposed gases.

The decomposed gas supply step may further include a heat exchange step of exchanging heat between the decomposed gases discharged from the absorption tower and the decomposed gases flowing into the absorption tower.

The decomposed gas supply step may further include an ammonia regeneration step of separating residual ammonia from a mixture of the residual ammonia and water mixed in the ammonia absorption step and supplying the separated residual ammonia to a vaporizer.

The decomposition step may further include an auxiliary heat exchange step of exchanging heat between the condensed water and the decomposed gases discharged from the decomposer section to cool the decomposed gases and vaporize the condensed water.

The decomposition step may further include a hydrogen separation step of separating hydrogen by introducing the decomposed gases from which the residual ammonia has been removed in the absorption tower into a refiner.

In the combined power generation system according to the present disclosure, ammonia is decomposed using exhaust gas from the gas turbine into decomposed gases, which are combusted to perform power generation, so that the emission of carbon dioxide may be reduced and the thermal efficiency may be improved. In addition, since steam is condensed using the cold heat generated in the process of vaporizing the liquefied ammonia, thermal efficiency may be further improved.

DETAILED DESCRIPTION OF THE INVENTION

Figure 1:
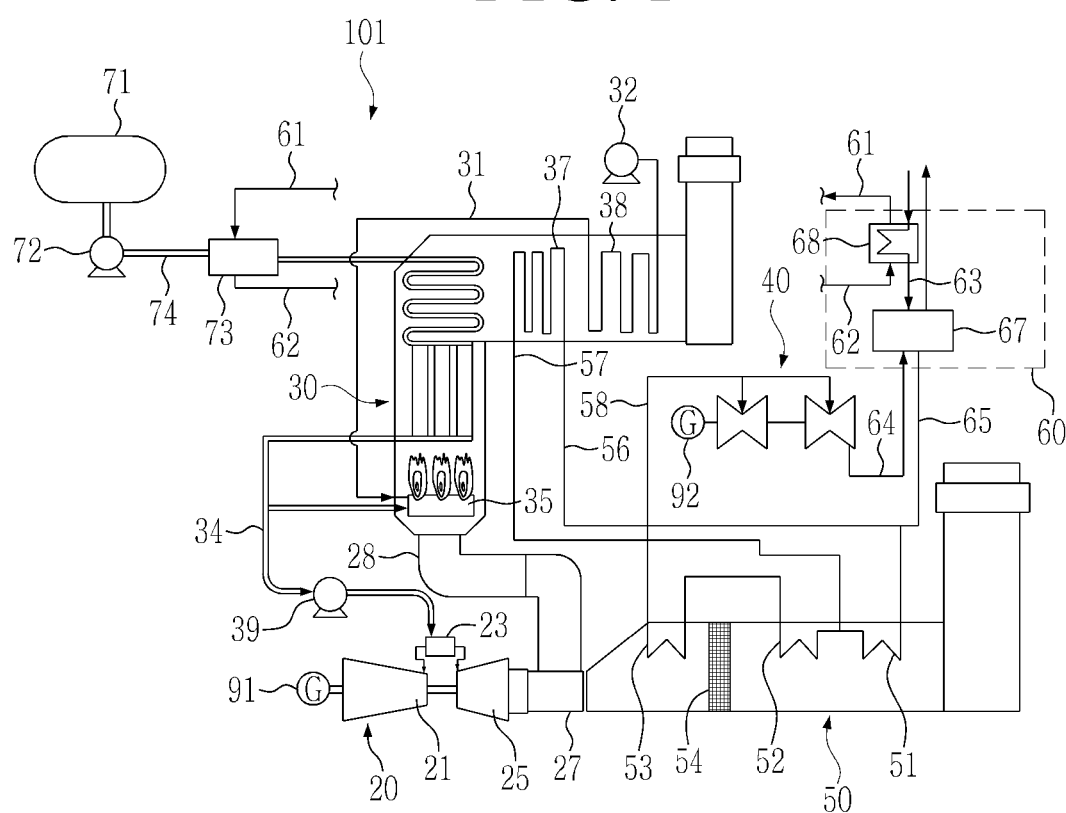
FIG. 1 is a block diagram illustrating a combined power generation system according to a first embodiment of the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, a combined power generation system according to a first embodiment of the present disclosure will be described.

FIG. 1 is a block diagram illustrating a combined power generation system according to a first embodiment of the present disclosure.

Referring to FIG. 1, the combined power generation system 101 according to the first embodiment includes a plurality of turbines to generate electric power. The combined power system 101 includes a gas turbine 20, generators 91 and 92, a heat recovery steam generator (HRSG) 50, a steam turbine 40, an ammonia decomposer section 30, a first exhaust gas line 27, a second exhaust gas line 28, a condenser section 60, a cold heat transfer line 62, and a decomposed gas supply line 34.

The gas turbine 20 according to this embodiment may serve to suck atmospheric air, compress the sucked air to a high pressure, burn an air-fuel mixture in static pressure conditions to release thermal energy, expand this high temperature combustion gas for conversion into kinetic energy, and then discharge exhaust gases containing the residual energy to the atmosphere.

The gas turbine 20 may include a compressor 21, a combustor 23, and a main turbine section 25. The compressor 21 of the gas turbine 20 may suck and compress external air. The compressor 21 may serve both to supply the compressed air by compressor blades to the combustor 23 and to supply the cooling air to a high temperature region of the gas turbine 20 to be cooled. Here, since the sucked air undergoes an adiabatic compression process in the compressor 21, the air passing through the compressor 21 increases in pressure.

The compressor 21 is usually designed as a centrifugal compressor or an axial compressor, wherein the centrifugal compressor is applied to a small-scale gas turbine, whereas a multi-stage axial compressor is applied to a large-scale gas turbine 20.

On the other hand, the combustor 23 may mix compressed air supplied from an outlet of the compressor 21 with fuel and combust the air-fuel mixture at a constant pressure to produce a high-energy combustion gas.

High temperature, high pressure exhaust gas generated by the combustor 23 is supplied to the main turbine section 25. In the main turbine section 25, the exhaust gas undergoes adiabatic expansion and impacts and drives a plurality of blades arranged radially around a rotary shaft of the main turbine section 25 so that heat energy of the exhaust gas is converted into mechanical energy with which the rotary shaft is rotated. A portion of the mechanical energy obtained from the main turbine section 25 is supplied as the energy required for compressing the air in the compressor 21, and the rest is utilized as an available energy to drive the generator 91 to produce electric power.

The exhaust gas discharged from the main turbine section 25 is supplied to the HRSG 50 through the first exhaust gas line 27. The exhaust gas is cooled through the HRSG 50 and then purified and discharged to the outside. The HRSG 50 serves to not only cool the combustion gas, but also generate high-temperature and high-pressure steam using the heat of the combustion gas and deliver it to the steam turbine 40.

The steam generated in the HRSG 50 is transmitted to the steam turbine 40 through a steam feed line 58, and the feedwater cooled in the steam turbine 40 is transmitted to the condenser section 60 through a feedwater recovery line 64.

The steam turbine 40 rotates blades using the steam generated by the HRSG 50 and transmits the rotational energy to the generator 92. The steam turbine 40 supplies the cooled steam back to the HRSG 50.

The condenser section 60 for condensing steam is connected to the feedwater recovery line 64, and may include a condenser 67 for condensing the steam discharged from the steam turbine 40, a coolant supply line 63 for supplying a coolant to the condenser 67, and a coolant heat exchanger 68 connected to the coolant supply line 63. The condensed water cooled in the condenser 67 may be delivered to the HRSG 50 or a feedwater branch line 56.

The condenser 67 exchanges heat between the coolant and the steam transferred from the steam turbine 40 to condense the steam into water. The coolant heat exchanger 68 cools the coolant by receiving a cold heat from the cold heat transfer line 62 connected to the vaporizer 73. The refrigerant transfer line 61 is connected to the coolant heat exchanger 68 and transfers a refrigerant heated in the coolant heat exchanger 68 to the vaporizer 73.

The "cold heat" throughout this application means a low temperature heat, having a lower temperature than a temperature of a relevant surrounding in a particular setting. For example, when a cold heat is provided to, applied to or transferred to a component, it means the temperature of the cold heat is lower than the temperature of the component and thus the component is cooled down by the cold heat. Similarly, when a component absorbed a cold heat, it means the component is cooled down by the cold heat. Further, when a heat is taken from a component, it may be described as that the component absorbed a cold heat. Furthermore, when a material changes its status, by absorbing a heat, from one state containing a lower energy to another state containing a higher energy (e.g., changing the status from a liquid to a gas), it may be described as that a cold heat is generated.

The coolant supply line 63 connects the coolant heat exchanger 68 and the condenser 67 to supply the coolant cooled in the coolant heat exchanger 68 to the condenser 67. The feedwater supply line 65 for transferring the feedwater condensed in the condenser 67 to the HRSG 50 may be connected to the condenser 67. A pump for pressurizing and supplying the condensed water condensed in the condenser 67 to the HRSG 50 may be mounted on the feedwater supply line.

The steam flowing in the HRSG 50 may have at least two or three levels of pressure, and accordingly, the feedwater is pressurized to at least two or three pressure levels. In this embodiment, the HRSG 50 is exemplified as having three levels of pressure.

The HRSG 50 may include an economizer 51 that increases the temperature of boiler water, an evaporator 52 that produces steam, and a superheater 53 that increases the temperature of steam. In addition, a purifier 54 for removing contaminants may be installed inside the HRSG 50. The purifier 54 may include a selective catalytic reduction device for removing nitrogen oxides, and the like.

The ammonia decomposer section 30 thermally decomposes gaseous ammonia to generate hydrogen and nitrogen. The ammonia decomposer section 30 decomposes ammonia using a catalyst including a metal such as ruthenium, nickel, etc. The exhaust gas discharged from the main turbine 25 is supplied to the ammonia decomposer section 30 through the second exhaust gas line 28, and the exhaust gas provides heat to the ammonia decomposer section 30.

The ammonia decomposer section 30 further may include an auxiliary burner 35, and the decomposed gas supply line 34 is connected to the auxiliary burner 35 to supply the decomposed gas to the auxiliary burner 35. The auxiliary burner 35 generates heat by burning the decomposed gas, and ammonia may be heated and decomposed by the heat generated from the auxiliary burner 35 and the exhaust gas discharged from the gas turbine 20. The auxiliary burner 35 may be operated only when the temperature of the exhaust gas discharged from the gas turbine is not sufficiently high at the time of initial start-up.

The decomposed gas generated in the ammonia decomposer section 30 may be delivered to the combustor 23 and the auxiliary burner 35 through the decomposed gas supply line 34. A decomposed gas compressor 39 for increasing the supply pressure of the decomposed gas may be installed in the decomposed gas supply line 34.

An ammonia storage section 71 is a tank for storing liquefied ammonia, and an ammonia supply line 74 is connected to the ammonia storage section 71. A pump 72 for circulating liquefied ammonia may be installed in the ammonia supply line 74. The ammonia supply line 74 vaporizes and supplies ammonia to the ammonia decomposer section 30.

A vaporizer 73 is connected to the ammonia supply line 74 to vaporize liquefied ammonia. A refrigerant transfer line 61 and a cold heat transfer line 62 are connected to the vaporizer 73. The refrigerant transfer line 61 transfers the refrigerant heated in the coolant heat exchanger 68 to the vaporizer 73, and the cold heat transfer line 62 transfers the refrigerant that absorbed the cold heat generated during vaporization of the liquefied ammonia in the vaporizer 73 to the coolant heat exchanger 68. Accordingly, the cold heat of the vaporizer 73 is transferred to the coolant heat exchanger 68 to cool the coolant to a low temperature, so that thermal efficiency can be improved.

On the other hand, the feedwater branch line 56 is installed in the feedwater supply line 65 supplying the feedwater to a condensate heater 37 and supplies the feedwater to the ammonia decomposer section 30. The condensate heater 37 heats the water condensed in the condenser 67 by heat exchange with the exhaust gas discharged from the ammonia decomposer section 30 (which may be referred to as ammonia decomposer exhaust gas). A feedwater return line 57 is connected to the condensate heater 37 and transfers the heated feedwater to the evaporator 52 of the HRSG 50.

According to an embodiment, an air supply line 31 is connected to the auxiliary burner 35 and supplies air for combustion of the decomposed gas to the auxiliary burner 35. An air preheater 38 may be installed in the air supply line 31 to heat the air supplied to the auxiliary burner 35 with the exhaust gas discharged from the ammonia decomposer section 30. The air supply line 31 may be provided with a supply air compressor 32 for compressing and supplying the air. When the air preheater 38 is installed, since the air is heated with the gas discharged from the ammonia decomposer section 30, thermal efficiency can be improved.

As described above, according to the present embodiment, since the decomposed gas generated by the decomposition of ammonia is combusted in the combustor 23, the generation of carbon dioxide may be significantly reduced during combustion. In addition, since the decomposition of ammonia is carried out by a heat source of the exhaust gas discharged from the gas turbine 20, and the cold heat generated during the vaporization of the liquefied ammonia is utilized for the condensation of steam, thermal efficiency can be improved.

Hereinafter, a method of driving the combined power generation system according to the first embodiment of the present disclosure will be described.

Figure 2:
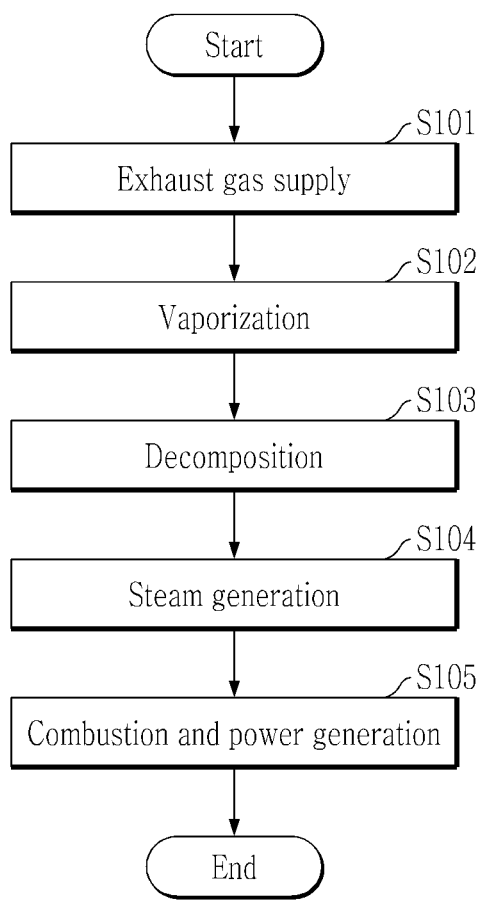
FIG. 2 is a flowchart illustrating a method of driving the combined power generation system according to the first embodiment of the present disclosure.

FIG. 2 is a flowchart illustrating a method of driving the combined power generation system according to the first embodiment of the present disclosure.

Referring to FIGS. 1 and 2, the driving method of the combined power generation system according to the first embodiment includes an exhaust gas supply step S101, a vaporization step S102, a decomposition step S103, and a steam generation step S104, and a combustion and power generation step S105.

In the exhaust gas supply step S101, the exhaust gas generated from the gas turbine 20 is supplied to the ammonia decomposer section 30 and the HRSG 50. In the exhaust gas supply step S101, the exhaust gas is generated in the combustor of the gas turbine 20 through combustion of fuel such as ammonia decomposition gas, and the exhaust gas is supplied to the HRSG 50 and the ammonia decomposer section 30 through the turbine 25 of the gas turbine 20.

In the vaporization step S102, the liquefied ammonia is vaporized and supplied to the ammonia decomposer section 30, and the cold heat generated during vaporization of ammonia is transferred to the condenser section 60. In the vaporization step S102, the cold heat generated in the vaporizer is transferred to the coolant heat exchanger 68 through the cold heat transfer line 62.

In the decomposition step S103, ammonia is decomposed into hydrogen, nitrogen, and the like to generate decomposed gases by using the heat of the exhaust gas supplied from the gas turbine 20. The decomposed gases may include hydrogen, nitrogen, and unreacted ammonia. In the decomposition step S103, ammonia may be decomposed using a catalyst including a metal such as ruthenium, nickel, etc. In the decomposition step S103, the generated decomposed gases are supplied to the combustor 23 and the auxiliary burner 35.

In the steam generation step S104, the condensed water is heated with the exhaust gas from the gas turbine 20 and supplied to a steam turbine. The steam generated and used in the steam generating step S104 is transferred to and easily condensed by the condenser section 60 with the cold heat generated during vaporization of ammonia.

In the combustion and power generation step S105, the decomposed gases are combusted in the combustor 23 to generate a high-pressure exhaust gas, which is in turn supplied to the main turbine 25 so that the generator 91 is powered by the rotational force of the main turbine 25. In addition, in the combustion and power generation step S105, a high-pressure steam generated in the HRSG 50 is supplied to the steam turbine 40, so that the steam turbine 40 may rotate the generator 92.

Hereinafter, a combined power generation system according to a second embodiment of the present disclosure will be described.

Figure 3:
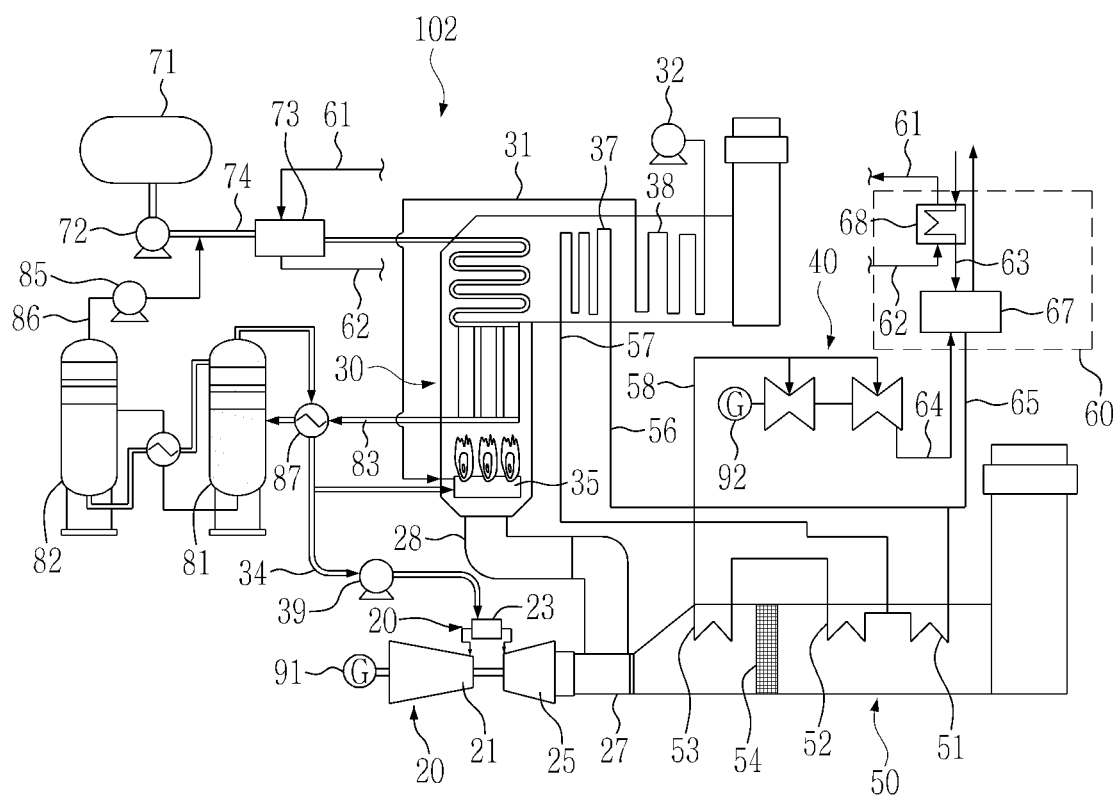
FIG. 3 is a block diagram illustrating a combined power generation system according to a second embodiment of the present disclosure.

FIG. 3 is a block diagram illustrating a combined power generation system according to the second embodiment of the present disclosure.

Referring to FIG. 3, the combined power generation system 102 according to this embodiment is the same as the combined power generation system according to the first embodiment, except for an absorption tower 81, a regeneration tower 82, and a decomposed gas heat exchanger 87, so a redundant description of the same configuration will be omitted.

An absorption line 83 for supplying decomposed gases to the absorption tower 81 is connected to the ammonia decomposer section 30, and the absorption tower 81 receives the decomposed gases from the ammonia decomposer section 30 through the absorption line 83 and separates the residual ammonia contained in the decomposed gases of ammonia. The absorption tower 81 separates unreacted ammonia from hydrogen or the like by spraying water to the decomposed gases.

The regeneration tower 82 receives an absorption liquid in which ammonia and water are mixed from the absorption tower 81 and separates ammonia from the absorption liquid. The regeneration tower 82 separates water and ammonia by heating the absorption liquid using a reheater and supplies the separated water to the absorption tower 81 and the separated ammonia to the ammonia supply line 74 through an ammonia regeneration line 86, respectively. According to an embodiment, ammonia compressor 85 may be installed in the ammonia regeneration line 86 to compress the ammonia separated in the regeneration tower 82 and transfer the compressed ammonia to the ammonia supply line 74.

The decomposed gas supply line 34 is connected to the absorption tower 81 and supplies the decomposed gases from which residual ammonia has been removed to the combustor 23 and the auxiliary burner 35. In addition, according to an embodiment, a decomposed gas heat exchanger 87 may be installed in the decomposed gas supply line 34 to exchange heat between the decomposed gases introduced into the absorption tower 81 and the decomposed gases discharged after ammonia is removed from the absorption tower 81.

When the decomposed gas heat exchanger 87 is installed in this way, the decomposed gases to be supplied to the combustor 23 and the auxiliary burner 35 are heated to improve combustion efficiency, and the decomposed gases to be supplied to the absorption tower 81 is cooled so that ammonia may be easily separated from the decomposed gases.

Hereinafter, a method of driving the combined power generation system according to the second embodiment of the present disclosure will be described.

Referring to FIG. 3, the driving method of the combined power generation system according to the present embodiment may include an exhaust gas supply step, a vaporization step, a decomposition step, a steam generation step, a combustion and power generation step. The driving method of the combined power generation system according to the present embodiment has the same configuration as the driving method of the combined power generation system according to the first embodiment, except for the decomposition step, so a redundant description of the same configuration will be omitted.

In the decomposition step, the decomposed gases are generated by decomposing ammonia into hydrogen, nitrogen, etc. using heat of the exhaust gas supplied from the gas turbine 20. The decomposed gases may include hydrogen, nitrogen, and unreacted ammonia. In the decomposition step, ammonia may be decomposed with a catalyst including a metal such as ruthenium, nickel, etc.

The decomposition step may include an ammonia absorption step comprising supplying the decomposed gases generated in the ammonia decomposer section to the absorption tower 81 and separating residual ammonia contained in the decomposed gases, a heat exchange step of exchanging heat between the decomposed gases discharged from the absorption tower 81 and the decomposed gases introduced into the absorption tower 81, and a regeneration step of transferring ammonia mixed with water provided from the absorption tower 81 to a regeneration tower 82 to separate water and ammonia in the regeneration tower 82.

In the ammonia absorption step, unreacted ammonia may be separated from hydrogen or the like by spraying water toward the decomposed gases. In the regeneration step, the ammonia separated from the ammonia-water mixture is transferred to the vaporizer 73, and the water separated from the ammonia-water mixture is transferred to the absorption tower 81.

Hereinafter, a combined power generation system according to a third embodiment of the present disclosure will be described.

Figure 4:
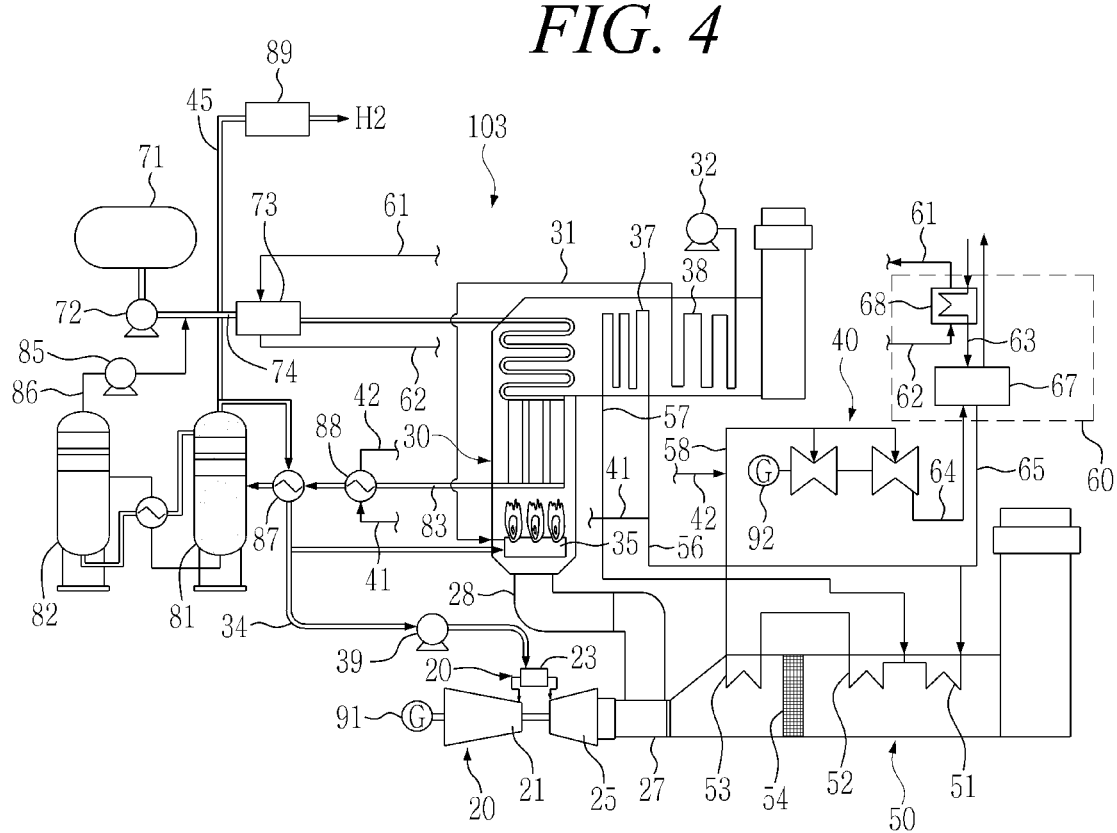
FIG. 4 is a block diagram illustrating a combined power generation system according to a third embodiment of the present disclosure.

FIG. 4 is a block diagram illustrating the combined power generation system according to the third embodiment of the present disclosure.

Referring to FIG. 4, the combined power generation system 103 according to this embodiment is the same as the combined power generation system according to the second embodiment, except for an auxiliary heat exchanger 88, so a redundant description of the same configuration will be omitted.

The auxiliary heat exchanger 88 may be installed in the absorption line 83 for exchanging heat between the decomposed gases discharged from the ammonia decomposer section 30 and condensed water. The auxiliary heat exchanger 88 uses condensed water supplied from the condenser section 60 to cool the decomposed gases discharged from the ammonia decomposer section 30 and recover heat of the decomposed gases to generate steam.

According to an embodiment, the decomposed gases discharged from the auxiliary heat exchanger 88 may be supplied to the decomposed gas heat exchanger 87, may heat-exchange with the decomposed gases discharged from the absorption tower 81 after ammonia is removed therefrom, and then may be supplied to the absorption tower 81.

A condensate heat exchange line 41 for supplying condensed water to the auxiliary heat exchanger 88 and a steam transfer line 42 for transferring vaporized condensed water to the steam turbine 40 are connected to the auxiliary heat exchanger 88. The condensate heat exchange line 41 may be connected to the feedwater branch line 56, and the steam transfer line 42 may be connected to the steam supply line 58.

Meanwhile, according to an embodiment, a refinement line 45 may be installed in the absorption tower 81 for circulating the decomposed gases in which unreacted ammonia has been removed in the absorption tower 81. A hydrogen refiner 89 for extracting hydrogen from the decomposed gases may be installed in the refinement line 45, wherein the hydrogen refiner 89 may be composed of a pressure swing adsorption (PSA) process facility. In addition, the hydrogen refiner 89 may be configured in a membrane type. The refined high-purity hydrogen may be supplied to the gas turbine 20 or otherwise supplied to a hydrogen demander.

Hereinafter, a method of driving the combined power generation system according to the third embodiment of the present disclosure will be described.

Referring to FIG. 4, the driving method of the combined power generation system according to the present embodiment may include an exhaust gas supply step, a vaporization step, a decomposition step, a steam generation step, a combustion and power generation step. The driving method of the combined power generation system according to the present embodiment has the same configuration as the driving method of the combined power generation system according to the first embodiment, except for the decomposition step, so a redundant description of the same configuration will be omitted.

In the decomposition step, the decomposed gases are generated by decomposing ammonia into hydrogen, nitrogen, etc. using heat of the exhaust gas supplied from the gas turbine 20. The decomposed gases may include hydrogen, nitrogen, and unreacted ammonia. In the decomposition step, ammonia may be decomposed with a catalyst including a metal such as ruthenium, nickel, etc.

The decomposition step may include an ammonia absorption step comprising supplying the decomposed gases generated in the ammonia decomposer section 30 to the absorption tower 81 and separating residual ammonia contained in the decomposed gases, a heat exchange step of exchanging heat between the decomposed gases discharged from the absorption tower 81 and the decomposed gases introduced into the absorption tower 81, a regeneration step of transferring ammonia mixed with water from the absorption tower 81 to a regeneration tower 82 to separate water and ammonia in the regeneration tower 82, and a hydrogen separation step of supplying the decomposed gases from which ammonia is removed in the absorption tower 81 to the refiner 89 and separating hydrogen from the ammonia-removed decomposed gases. In addition, the decomposition step may further include an auxiliary heat exchange step of exchanging heat between condensed water and the decomposed gases discharged from the decomposer section to cool the decomposed gases and to vaporize the condensed water.

In the absorption step, unreacted ammonia may be separated from hydrogen or the like by spraying water toward the decomposed gases. In the regeneration step, the ammonia separated from the ammonia-water mixture is transferred to the vaporizer 73, and the water separated from the ammonia-water mixture is transferred to the absorption tower 81. In the refinement step, hydrogen may be separated from the decomposed gases in a pressure swing adsorption (PSA) process. In the auxiliary heat exchange step, the decomposed gases discharged from the ammonia decomposer section are cooled by using the condensed water supplied from the condenser section to recover heat of the decomposed gases to generate steam.

Hereinafter, a combined power generation system according to a fourth embodiment of the present disclosure will be described.

Figure 5:
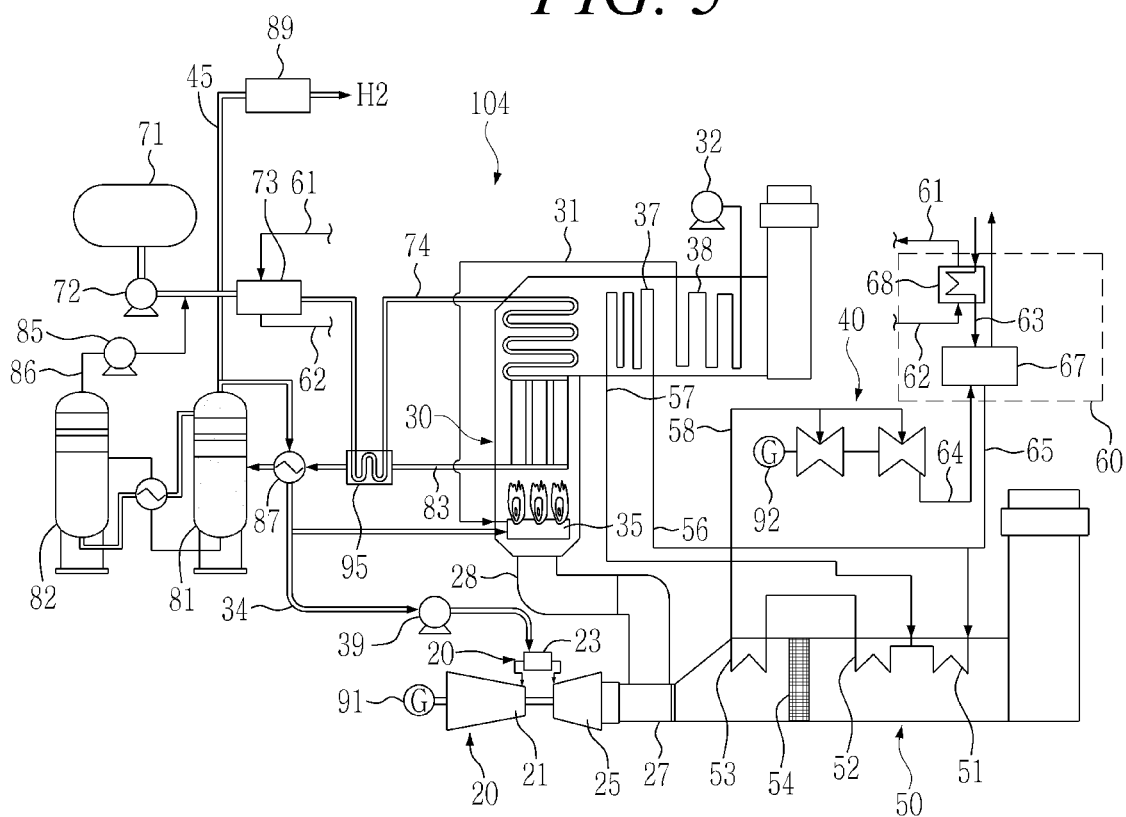
FIG. 5 is a block diagram illustrating a combined power generation system according to a fourth embodiment of the present disclosure.

FIG. 5 is a block diagram illustrating the combined power generation system according to the fourth embodiment of the present disclosure.

Referring to FIG. 5, the combined power generation system 104 according to the present embodiment has the same structure as the combined power generation system according to the second embodiment, except for a gas-gas heat exchanger 95, so a redundant description of the same configuration will be omitted.

The gas-gas heat exchanger 95 may be installed in the absorption line 83 for exchanging heat between the decomposed gases discharged from the ammonia decomposer section 30 and the ammonia discharged from the ammonia vaporizer 73. The gas-gas heat exchanger 95 uses ammonia discharged from the ammonia vaporizer 73 to cool the decomposed gases discharged from the ammonia decomposer section 30 and recover heat of the decomposed gases to heat the ammonia to be supplied to the ammonia decomposer section 30.

The decomposed gases discharged from the gas-gas heat exchanger 95 may be supplied to the decomposed gas heat exchanger 87 and then to the absorption tower 81 after being heat-exchanged with the decomposed gases discharged after ammonia is removed in the absorption tower 81.

Ammonia flowing through the ammonia supply line 74 is supplied to the ammonia decomposer section 30 after being heated in the gas-gas heat exchanger 95.

Hereinafter, a method of driving the combined power generation system according to the fourth embodiment of the present disclosure will be described.

Referring to FIG. 5, the driving method of the combined power generation system according to the present embodiment may include an exhaust gas supply step, a vaporization step, a decomposition step, a steam generation step, a combustion and power generation step. The driving method of the combined power generation system according to the present embodiment has the same configuration as the driving method of the combined power generation system according to the first embodiment, except for the decomposition step, so a redundant description of the same configuration will be omitted.

In the decomposition step, the decomposed gases are generated by decomposing ammonia into hydrogen, nitrogen, etc. using heat of the exhaust gas supplied from the gas turbine 20. The decomposed gases may include hydrogen, nitrogen, and unreacted ammonia. In the decomposition step, ammonia may be decomposed with a catalyst including a metal such as ruthenium, nickel, etc.

The decomposition step may include a gas-gas heat exchange step of exchanging heat between the decomposed gases discharged from the decomposer section and the ammonia discharged from the ammonia vaporizer 73.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure.

Also, it is noted that any one feature of an embodiment of the present disclosure described in the specification may be applied to another embodiment of the present disclosure.

The invention claimed is:

1. A combined power generation system comprising:
   a gas turbine combusting a fuel in a combustor to generate rotational force and discharging exhaust gas;
   a vaporizer vaporizing liquefied ammonia and supplying vaporized ammonia;
   an ammonia decomposer section decomposing the vaporized ammonia supplied from the vaporizer using the exhaust gas discharged from the gas turbine and generating decomposed gases;
   a heat recovery steam generator (HRSG) generating steam using the exhaust gas discharged from the gas turbine;
   a first exhaust gas line through which the exhaust gas discharged from the gas turbine is transferred to the HRSG;
   a steam turbine generating a rotational force with the steam transferred from the HRSG;
   a decomposed gas supply line through which the decomposed gases generated in the ammonia decomposer section are supplied to the combustor;
   a cold heat transfer line transferring a refrigerant that is cooled down by being deprived of heat during vaporization of the liquefied ammonia in the vaporizer and supplying the cooled refrigerant to the condenser section, and
   a condenser section, connected to the cold heat transfer line, condensing the steam discharged from the steam turbine using the cooled refrigerant received from the cold heat transfer line and discharging condensed water,
   a refrigerant transfer line, connected to the condenser section and the vaporizer, transferring a heated refrigerant from the condenser section to the vaporizer.

2. The combined power generation system according to claim 1, further comprising a second exhaust gas line through which the exhaust gas discharged from the gas turbine is supplied to the ammonia decomposer section.

3. The combined power generation system according to claim 1, wherein the condenser section comprises a condenser condensing the steam discharged from the steam turbine, a coolant supply line supplying a coolant to the condenser, and a coolant heat exchanger connected to the coolant supply line.

4. The combined power generation system according to claim 3, wherein the cold heat transfer line is connected to the coolant heat exchanger, and the cooled refrigerant is transferred to the coolant heat exchanger via the cold heat transfer line and cools the coolant.

5. The combined power generation system according to claim 1, further comprising an absorption tower receiving the decomposed gases generated in the ammonia decomposer section and separating residual ammonia contained in the decomposed gases, and an absorption line connecting the ammonia decomposer section and the absorption tower.

6. The combined power generation system according to claim 5, wherein a decomposed gas heat exchanger is installed in the decomposed gas supply line for exchanging heat between the decomposed gases supplied to the absorption tower and the decomposed gases discharged from the absorption tower.

7. The combined power generation system according to claim 5, wherein an auxiliary heat exchanger is installed in the absorption line for exchanging heat between the condensed water and the decomposed gases discharged from the ammonia decomposer section to cool the decomposed gases and vaporize the condensed water.

8. The combined power generation system according to claim 5, wherein a gas-gas heat exchanger is installed in the absorption line for exchanging heat between the decomposed gases discharged from the ammonia decomposer section and the vaporized ammonia discharged from the vaporizer.

9. The combined power generation system according to claim 5, further comprising:
an ammonia supply line through which the liquefied ammonia is supplied to the vaporizer;
a regeneration tower separating the residual ammonia from an absorption liquid in which the residual ammonia and water are mixed in the absorption tower, and
an ammonia regeneration line connecting the regeneration tower and the ammonia supply line.

10. The combined power generation system according to claim 9, wherein an ammonia compressor is installed in the ammonia regeneration line for compressing the residual ammonia separated in the regeneration tower.

11. The combined power generation system according to claim 5, wherein a refinement line is installed in the absorption tower for circulating the decomposed gases from which ammonia is separated in the absorption tower, and a hydrogen refiner is installed in the refinement line for separating hydrogen from the decomposed gases.

12. The combined power generation system according to claim 1, further comprising a condensate heater heating the condensed water condensed in the condenser section through heat exchange with ammonia decomposer exhaust gas discharged from the ammonia decomposer section.

13. The combined power generation system according to claim 11, wherein the ammonia decomposer section further comprises an auxiliary burner forming a flame, wherein the auxiliary burner is connected to the decomposed gas supply line to combust the decomposition gases supplied from the decomposed gas supply line, and the combined power generation system further comprises an air preheater heating air supplied to the auxiliary burner, using the ammonia decomposer exhaust gas discharged from the ammonia decomposer section.

14. A method of driving a combined power generation system, the method comprising:
an exhaust gas supply step of supplying an exhaust gas generated by combustion of a fuel in a combustor of a gas turbine to a heat recovery steam generator (HRSG) and an ammonia decomposer section;
a vaporization step of vaporizing liquefied ammonia and cooling a refrigerant by depriving the refrigerant of heat during the vaporization of the liquefied ammonia and condensing steam to condensed water using the cooled refrigerant;
a decomposition step of decomposing the vaporized ammonia into decomposed gases using heat of the exhaust gas and heat generated from an auxiliary burner;
a steam generation step of heating the condensed water using the exhaust gas and supplying the same to a steam turbine; and
a combustion and power generation step of combusting the decomposed gases in the combustor, rotating a main turbine with the generated exhaust gas, and supplying the steam to the steam turbine,
wherein in the vaporization step, the refrigerant heated during condensing the steam is transferred to a vaporizer through a refrigerant transfer line.

15. The method according to claim 14, wherein in the vaporization step, the refrigerant cooled in the vaporization step is transferred to a coolant heat exchanger through a cold heat transfer line and cools the coolant.

16. The method according to claim 15, wherein the decomposed gas supply step comprises an ammonia absorption step of supplying the decomposed gas generated in the ammonia decomposer section to an absorption tower to separate residual ammonia contained in the decomposed gases.

17. The method according to claim 16, wherein the decomposed gas supply step further comprises a heat exchange step of exchanging heat between the decomposed gases discharged from the absorption tower and the decomposed gases flowing into the absorption tower.

18. The method according to claim 17, wherein the decomposed gas supply step further comprises an ammonia regeneration step of separating residual ammonia from a mixture of the residual ammonia and water mixed in the ammonia absorption step and supplying the separated residual ammonia to a vaporizer.

19. The method according to claim 17, wherein the decomposition step further comprises an auxiliary heat exchange step of exchanging heat between the condensed water and the decomposed gases discharged from the decomposer section to cool the decomposed gases and vaporize the condensed water.

20. The method according to claim 17, wherein the decomposition step further comprises a hydrogen separation step of separating hydrogen by introducing the decomposed gases from which the residual ammonia has been removed in the absorption tower into a refiner.

* * * * *